United States Patent
Dybas et al.

[11] Patent Number: 5,255,089
[45] Date of Patent: Oct. 19, 1993

[54] PORTABLE PARTICLE DETECTOR ASSEMBLY

[75] Inventors: David E. Dybas, Clintondale, N.Y.; Kurt L. Haller, Colchester, Vt.; Edward F. Patterson; Gary S. Selwyn, both of Hopewell Junction, N.Y.

[73] Assignee: International Business Machines Corporation, Armonk, N.Y.

[21] Appl. No.: 858,183

[22] Filed: Mar. 26, 1992

[51] Int. Cl.⁵ .............................. H04N 7/18
[52] U.S. Cl. ..................... 358/101; 250/574; 356/337; 358/207
[58] Field of Search ............ 358/93, 101, 106, 107; 382/8; 250/574; 356/337, 338, 339

[56] References Cited

U.S. PATENT DOCUMENTS

| | | |
|---|---|---|
| Re. 33,213 | 5/1990 | Borden . |
| 4,125,778 | 11/1978 | Smart . |
| 4,164,373 | 8/1979 | Schuss et al. . |
| 4,231,661 | 11/1980 | Walsh et al. . |
| 4,286,293 | 8/1981 | Jablonowski ............ 358/199 |
| 4,377,238 | 3/1983 | Wilks et al. . |
| 4,377,340 | 3/1983 | Green et al. . |
| 4,402,612 | 12/1983 | Alexander et al. . |
| 4,441,124 | 4/1984 | Heebner ............... 358/106 |
| 4,614,968 | 9/1986 | Rattman et al. . |
| 4,662,749 | 5/1987 | Hatton et al. . |
| 4,672,218 | 6/1987 | Chrisman et al. . |
| 4,672,437 | 6/1987 | Casper . |
| 4,677,473 | 6/1987 | Okamoto et al. . |
| 4,707,134 | 11/1987 | McLachlan et al. . |
| 4,772,127 | 9/1988 | Chase et al. . |
| 4,804,853 | 2/1989 | Borden et al. . |
| 4,827,143 | 5/1989 | Munakata et al. . |
| 4,878,114 | 10/1989 | Huynh et al. . |
| 4,885,473 | 12/1989 | Shofner et al. . |
| 4,896,048 | 1/1990 | Borden . |
| 4,898,471 | 2/1990 | Stonestrom et al. . |
| 4,965,665 | 10/1990 | Amir . |
| 4,988,202 | 1/1991 | Nayar et al. . |
| 5,006,719 | 4/1991 | Blaser . |

FOREIGN PATENT DOCUMENTS

| | | |
|---|---|---|
| 58-62544 | 4/1983 | Japan . |
| 58-62545 | 4/1983 | Japan . |

OTHER PUBLICATIONS

Michael J. Riezenman, More Tools, Processes Yield to Microprocessor Control, Electronics, Oct. 1976.

Primary Examiner—Howard W. Britton
Attorney, Agent, or Firm—Whitham & Marhoefer

[57] ABSTRACT

A portable particle detector assembly for detecting particle contamination in the reaction chamber of a plasma processing tool used in semiconductor manufacture. The detector is comprised of a scanner assembly for providing a scanned laser beam and a video camera placed opposite the scanner assembly for monitoring light scattered by particles within the volume of the reaction chamber.

17 Claims, 8 Drawing Sheets

PORTABLE PARTICLE DETECTOR ASSEMBLY

CROSS-REFERENCE TO RELATED APPLICATION

The invention disclosed herein is related in subject matter to that of copending application Ser. No. 07/425,659 filed on Oct. 28, 1989, by R. S. Bennett et al. and assigned to a common assignee. The disclosure of that application is incorporated herein by reference.

BACKGROUND OF THE INVENTION

1. Field of the Invention

The present invention generally relates to monitoring and testing equipment useful in semiconductor manufacturing and, more particularly, to a portable laser light scattering assembly used for in situ detection of particles formed and suspended during plasma processing within a reaction chamber.

2. Description of the Prior Art

Recent studies in our laboratory have shown that many plasmas produce particles which may be a significant cause of product contamination and device failure. These experiments have shown that particles can be nucleated and suspended in a process plasma until they grow to significant size. Observed particle sizes have ranged from submicrons to hundreds of microns in diameter. Micron scale particle contamination is a serious problem in semiconductor device manufacture. Many device yield loss and reliability problems are attributed to particle contamination from plasma processes. Particle contamination may causes device failure, poor film quality, changes in material resistivity, and impurity permeation. The problems due to particle contamination are expected to increase as device dimensions are reduced in future technologies.

The particles eventually fall onto semiconductor wafers being processed in the plasma environment. If particles fall before or during film deposition or pattern transfer, they could disrupt those process steps. If they fall at the end of a process step, the particles may disrupt subsequent process steps.

The effects of particle contamination can be magnified by selective plasma etching processes, which rely on a combination of feed gases and etching conditions to selectively etch material surfaces on the wafer. The chemical formation of particles which are themselves slowly etched in these highly selective plasmas form a so-called micromask resulting in an irregular surface often referred to as "grass". These spikes and hillocks of unetched material degrade device performance and reduce process yield.

Our experiments have shown that the plasma itself can result in product contamination. It is therefore important to develop means to operate the plasma while controlling or eliminating particle formation. Laser light scattering studies in our laboratory have indicated that the plasma composition and gas flow have a pronounced effect on the formation of particle contamination in etching plasmas. In particular, faster gas flow, resulting in shorter residence time in the plasma, as well as lower gas pressures and shorter plasma exposure all tend to inhibit particle formation in certain plasmas. Feed gas chemistry also has an important effect on particle formation.

While it is now recognized that the largest share of total surface contamination is contributed by plasma tools and processes, few methods exist for controlling process induced particle contamination, and no qualitative and quantative techniques exist for detecting and evaluating this contamination inside a tool vacuum chamber during processing.

Current contamination measurement methods rely on the use of blanket (i.e., unpatterned) monitor wafers processed with product wafers. The monitor wafers are removed from the plasma processing tool and analyzed in a surface contamination monitoring tool. One problem with this post-process analysis is that many wafers have already been processed when the monitor wafers are analyzed, so that this method does not detect contamination problems before they affect lots of product wafers. Also, post-process analysis provides little information as to various sources of contamination, the distribution of particles in the process chamber volume and the process conditions that influence the formation of growth particles.

Clearly, it is highly desirable to monitor particles in situ during processing. In this way, contamination sources can be identified and controlled with the capability for real-time feedback of process contamination data necessary for optimization of process/tool cleanliness.

Laser light scattering (LLS) is an effective means of detecting particles larger than 0.2 $\mu$m. This method has been demonstrated for in situ detection of particles in plasma processing tools as reported by G. S. Selwyn, J. S. McKillop, K. L. Haller, and I. J. Wu, *J. Vac. Sci. Tech.*, A8, 1726 (1990), G. S. Selwyn, J. Singh, and R. S. Bennett, *J. Vac. Sci. Tech.*, A7, 2758 (1989), and G. S. Selwyn, K. L. Haller, and J. E. Heidenreich, *Appl. Phys. Lett.*, 57, 1876 (1990). These studies have shown that tool and process design has a marked effect on the level of particle contamination and that the particles are electrostatically suspended at the plasma/sheath boundary. Electrostatic suspension of the particles also simplifies their detection because the particles will be concentrated, more or less, into a plane at the plasma/sheath boundary.

SUMMARY OF THE INVENTION

It is therefore an object of the present invention to provide a real-time, visual determination of particle contamination in plasma processing equipment.

It is another object of the invention to provide a laser light scattering assembly used for in situ detection of particles formed and suspended during plasma processing of microelectronic, magnetic and optical devices.

It is a further object of the invention to provide a particle detector assembly which may be used for analysis and control in the manufacture of microelectronic, magnetic and optical devices.

It is yet another object of the invention to provide a laser light scattering assembly which is both portable and meets safety requirements for manufacturing personnel.

It is also an object of the invention to provide a laser light scattering particle measuring apparatus which is capable of detecting the relative densities of different sized particles suspended in a plasma.

According to the invention, there is provided a laser light scattering (LLS) tool for detection of particle contamination inside a plasma tool during semiconductor wafer processing. The LLS tool is tailored to the unique requirements of the conditions within a plasma reaction chamber. It is recognized, for example, that the particles suspended in the plasma have a distribution which is neither random nor uniform. Rather, the particles tend to collect in certain regions, particularly near the sheath boundary. Within these regions, the regions in the vicinity of the wafer surface is of most interest. Therefore, the LLS tool according to the present invention scans only key regions within the reaction chamber, allowing the apparatus to operate at maximum sensitivity and at a sufficiently high scan rate to detect real-time particle motion in the plasma. Real-time operation makes possible practical analysis and control during the plasma process to minimize or eliminate particle contamination.

The LLS tool of the invention is compact, using miniature optics and/or fiber optic cables, and is non-intrusive to the plasma. To avoid exposing manufacturing personnel to laser light, the assembly uses air-tight light shields and pressure interlocks to detect any opening of the sealed assembly, a video camera for detection of scattered light and the reaction chamber interior, and pressure sensitive microswitches to insure that the assembly is mounted against the reaction chamber windows. A pressure sensor is also attached to the plasma processing tool to ensure that a vacuum is present when the laser is on, to avoid personnel exposure when the plasma tool may be open. The light scattering signal and the plasma tool interior is viewed on a video monitor. Using a video cassette recorder, the light scattering signal can be permanently recorded for each processing run for future archival reference and process improvement. Alternatively, the video signal may be digitized and stored for archival and analysis purposes.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
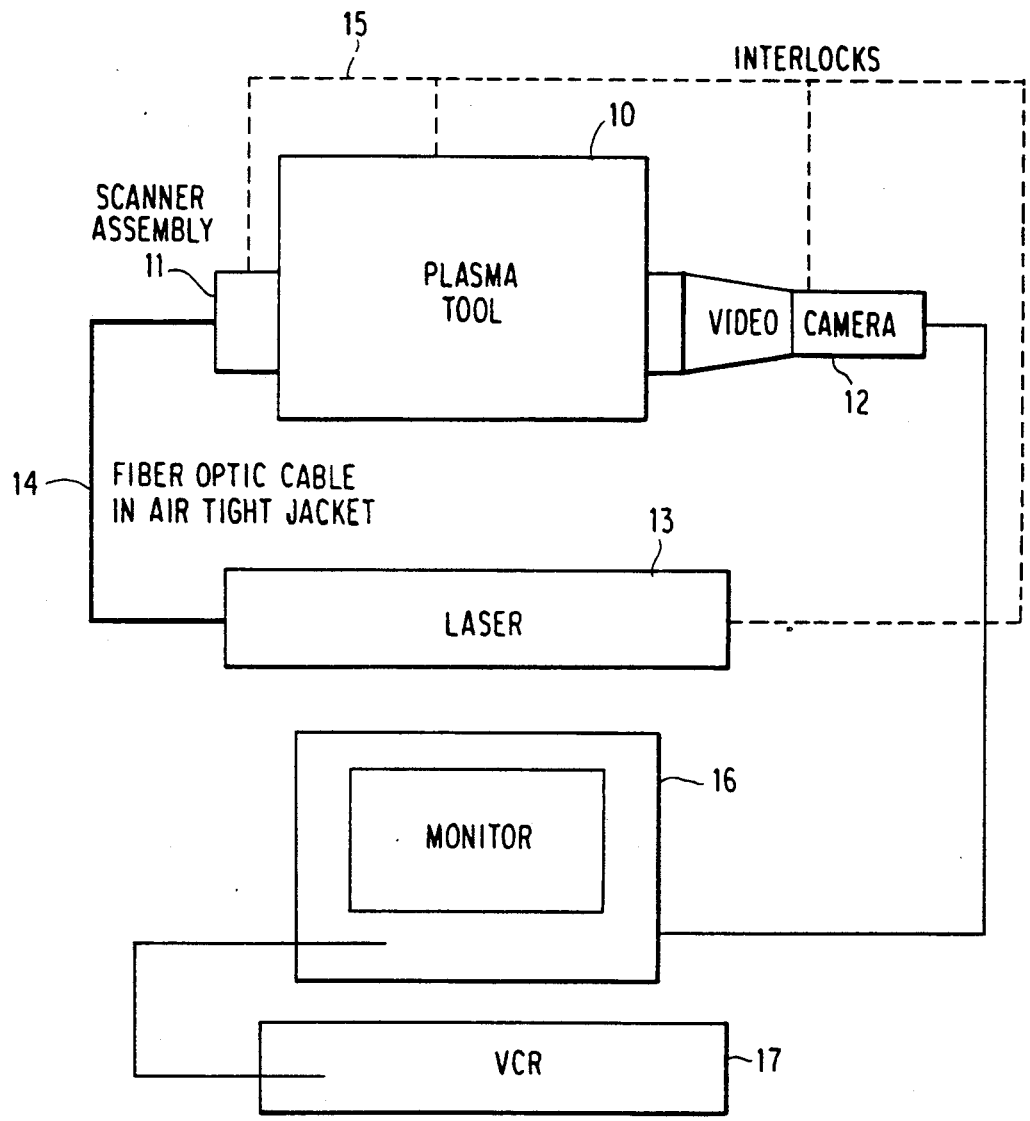
FIG. 1 is a block diagram of the portable plasma particle detector assembly used in conjunction with a television monitor and video cassette recorder according to one aspect of the invention.

Referring now to the drawings, and more particularly to FIG. 1, there is shown a block diagram of the portable plasma particle detector assembly for use with a semiconductor plasma process tool 10. The plasma process tool 10 is provided with windows (not shown) approximately aligned on diametrically opposite sides of the tool. Plasma-Therm produces a plasma tool having the proper and preferred window alignment. Applied Materials Corporation also produces the AMC Precision 5000 with the required window arrangements for laser light scattering. The windows in the plasma tool allow an unobstructed view of the laser light scattered within the volume of the plasma process tool between the two windows. A laser light scanner 11 is attached to one of these windows, and a video camera 12 is attached to the opposite window. The scanner assembly is pressed against one window of the plasma tool with the camera hood on the opposite port. Contact-sensitive switches (not shown) are closed by placing the scanner assembly and camera hood in position to enable laser operation. A laser 13 is optically connected to the laser light scanner 11 via a fiber optic cable 14 in an air tight jacket. The laser 13, the laser light scanner 11 and the video camera 12 are interlocked with the plasma process tool 10, as indicated by the dotted line 15.

The output of the video camera 12 is connected to a television monitor 16 and a video cassette recorder (VCR) 17. The television monitor 16 permits viewing the interior of the reaction chamber of the plasma processing tool 10 and the light scattering signal produced by laser light scattered by particles within the tool 10. The light scattering signal is also recorded by the VCR 17 to provide a record of each processing run for future reference and process improvement. In an alternate embodiment, a fiber optic boroscope is used in place of the camera lens. This enables use of a reduced window diameter.

Most plasma tools provide at least one window. These are usually used to detect plasma operation by observation of the plasma emission or for spectroscopic analysis of the plasma emission for endpoint detection. Some plasma tools provide two or three windows. The invention requires two windows, approximately diametrically aligned and providing a view more or less parallel to the plasma/sheath boundary, or "dark space". This is necessary as the light scattering intensity is highly directed along the forward direction of the laser beam. In some cases, the tool needs to be modified to provide a second window. When a second window needs to be provided, it is beneficial and preferred to align the camera window opposite and slightly above the position of the laser or scanner window. In this way, when the laser is scanned within the sheath boundary, the beam terminates on the opposite wall rather than exiting the camera window. This increases the safety of the operation and reduces the risk of damage to the camera. While this "offset" design is not critical, it is preferred.

As previously mentioned, the subject invention is not concerned with total particle counts in the plasma. Rather, the invention is concerned with measuring relative particle densities at specific regions within the reaction chamber. Information on the densities of relative sizes of particles also can be useful in analyzing the operation of the plasma processing tool and diagnosing the cause and character of contamination problems. Different light wavelengths are scattered at different angles and intensities by different sized particles. Therefore, the colors (i.e., frequencies) of the scattered light signal are detected and recorded for analysis. This provides a measure of relative change in particle size.

Figure 2:
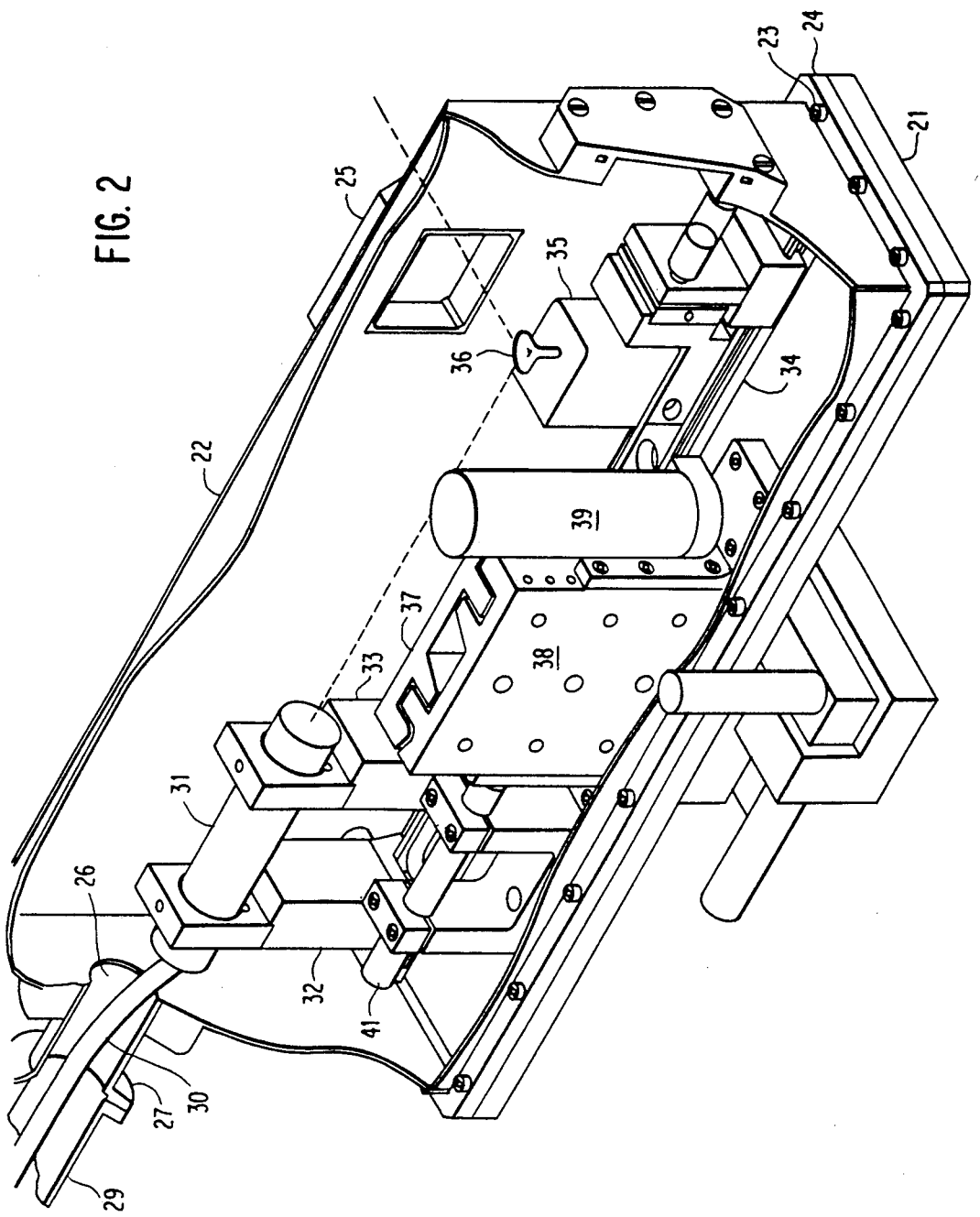
FIG. 2 is an isometric diagram showing the details of the laser light scanner assembly.

An important feature of the invention is the novel construction of the laser light scanning assembly 11. In one embodiment, shown in FIG. 2, the assembly comprises a base member 21 to which a cover 22 is attached by bolts 23 through a flange 24 brazed to the cover 22. In FIG. 2, the cover 22 is shown partly cut away, but it will be understood that the attachment of the cover 22 to the base member 21 provides a sealed enclosure, preferably by means of an O-ring (not shown) between the flange 24 and the base member 21.

There are two apertures provided in the cover 22. The first of these is a window 25 which is adapted to be pressed against a window on the plasma processing tool 10, shown in FIG. 1. The second aperture 26 is provided with a flanged coupler 27 to secure the sheath 29 of a fiber optic cable 30. The cable 30 terminates in an optical coupler 31 secured in vertical stantions 32 and 33 mounted to a dovetailed track 34. Mounted to the same track 34, and thereby assuring axial alignment with the coupler 31, is a scanner assembly comprising an oscillating motor drive 35 and a mirror 36 which oscillates about a vertical axis perpendicular to the axis from the coupler 31 to the mirror 36. The oscillating mirror thus deflects the laser light emanating from the coupler 31 through the window 25 and sweeps that light in a horizontal direction across the interior of the plasma processing tool.

The track 34 is carried by a vertical positioner comprised of first and second interlocking members 37 and 38. The track 34 is mounted to the outwardly exposed face of member 37 which is vertically slidable within member 38. Member 38 is mounted to base member 21. A motor 39, having its case mounted to member 38, drives member 37 to position it vertically. An electromechanical sensor 41 provides an output feedback signal indicating the vertical position of the member 37 and, hence, the vertical position of track 34. Thus, by controlling the motor 39, the vertical position of the horizontal line swept by oscillating mirror 36 may be adjusted without removing the cover 22.

Figure 3:
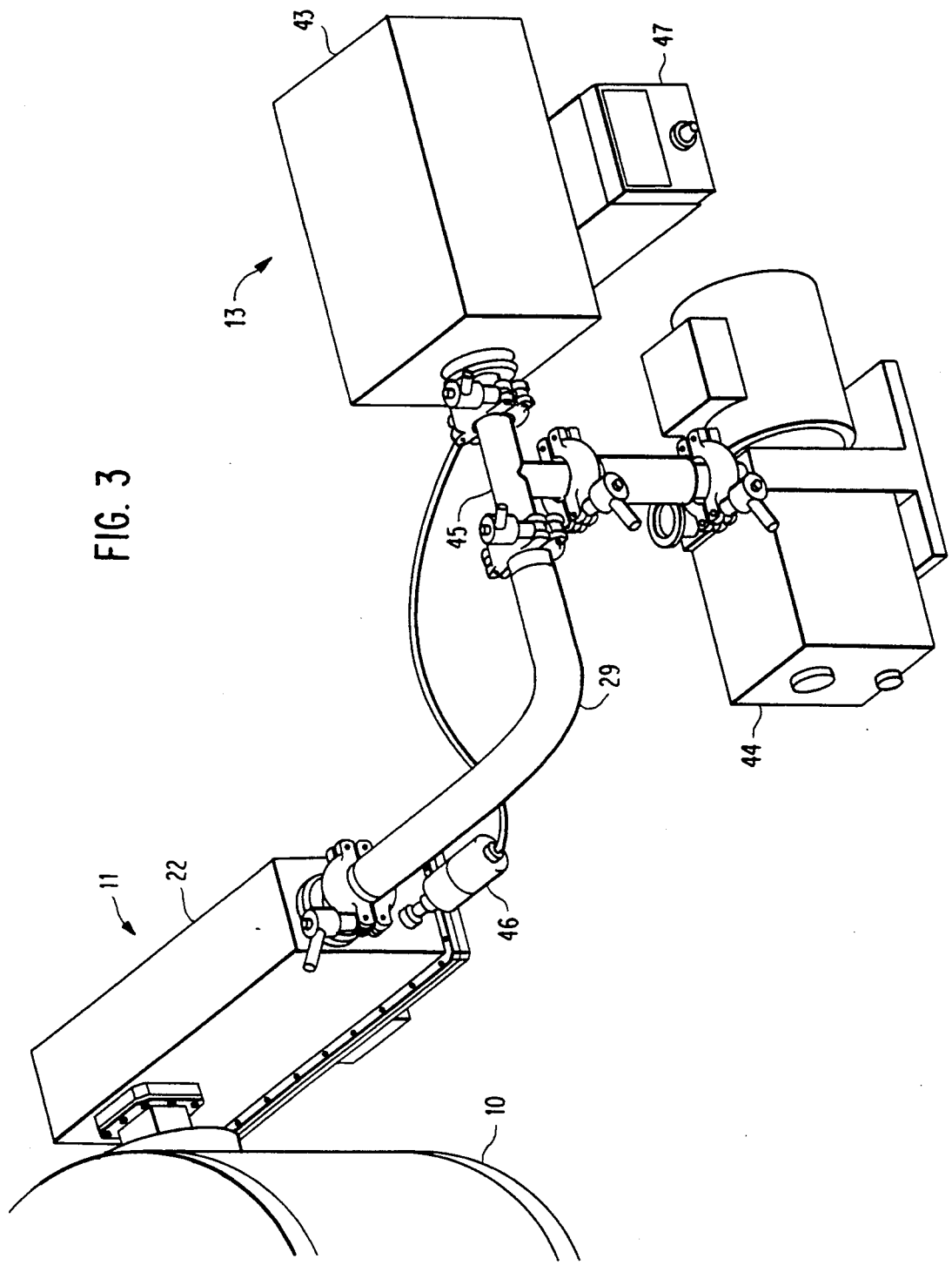
FIG. 3 is an isometric diagram showing the connections of the scanner assembly to the laser and interconnect system.

FIG. 3 shows the scanner assembly 11 against a window of the plasma tool 10. The laser 13 is housed within the container 43 and connected via the fiber optic cable sheath 29, and the fiber optic cable within the sheath, to the scanner assembly 11. The entire system, including the scanner assembly 11, the laser container 43 and the cable sheath 29, is evacuated by a mechanical pump 44 connected to the sheath 29 via a "T" connector 45. A pressure sensor 46 attached to the cover 22 of the scanner assembly 11 senses the interior pressure within this system and provides an output signal to the interlock control 47. Another pressure sensor (not shown) detects a vacuum in the plasma processing tool and provides a signal to the interlock control 47. Such pressure sensors are typically included in commercial plasma processing tools, and the invention takes advantage of this by simply connecting a signal wire to the sensor provided on the tool and to the interlock control. This signal ensures that a vacuum is present when the laser is on so that there is no risk of laser exposure to personnel when the tool is open. The interlock control 47 also receives inputs from microswitches (not shown) for each of the scanner assembly 11 and the video camera 12 (mounted to the opposite side of the plasma tool 10). These microswitches indicate whether the scanner assembly 11 and the video camera 12 are properly fitted to the plasma tool so that laser light does not escape and pose a hazard to operating personnel. The interlock control 47 controls the power to the laser 13 preventing it from being energized should the threshold pressure sensed by sensor 46 exceed a predetermined minimum or if either of the microswitches attached to the scanner assembly or the video camera indicate an improper installation to the plasma tool 10.

Figure 4:
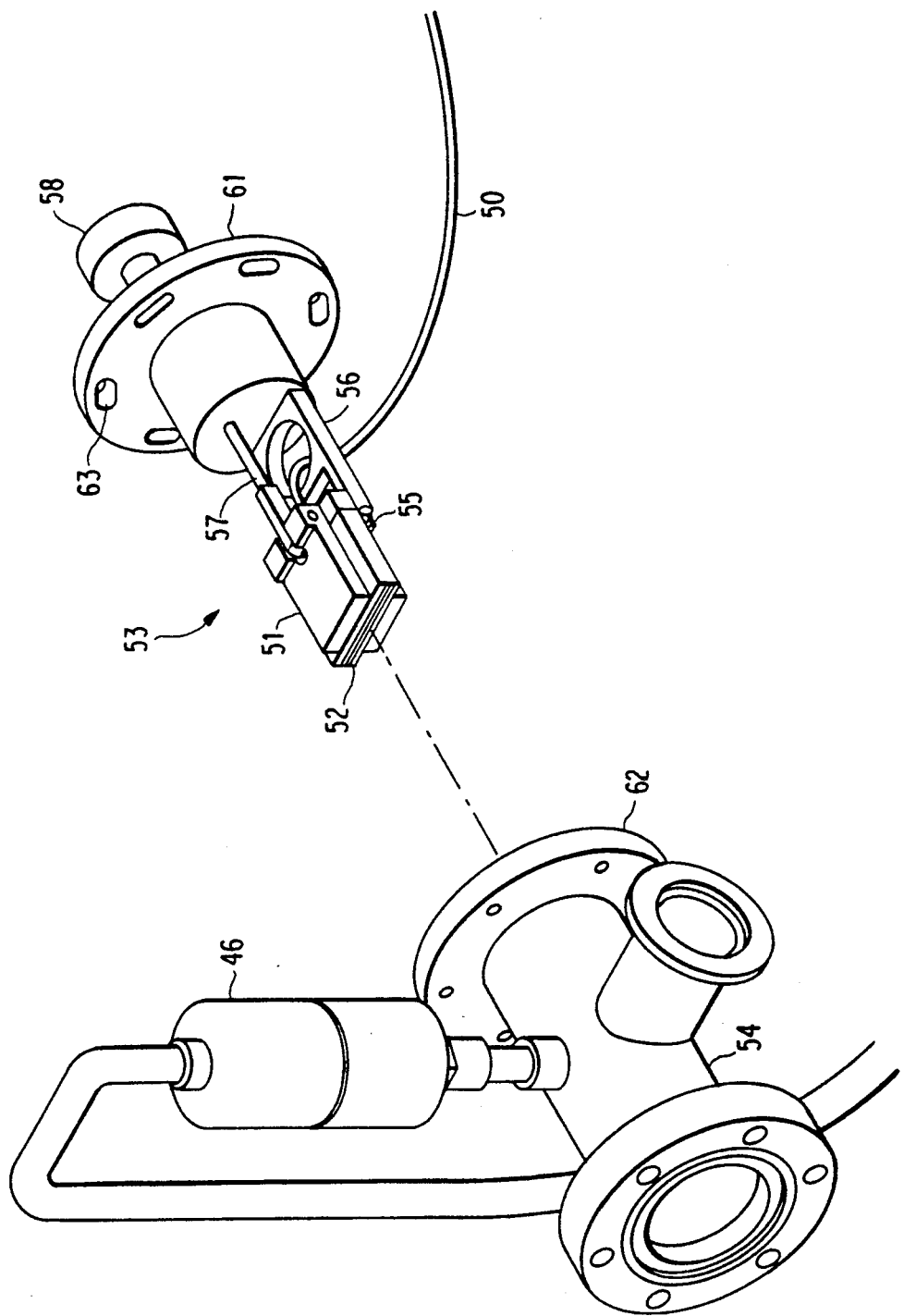
FIG. 4 shows an alternative embodiment to the laser light scanning assembly shown in FIG. 2 which uses a spot-to-line fiber optic bundle cable.

In an alternate embodiment shown in FIG. 4, the scanner assembly is replaced with a spot-to-line fiber optic bundle cable 50 for increased ruggedness and reduced cost. The laser beam is directed into a circular, closely packed end of the multiple fiber optic cable 50 and the other end of the cable, which terminates in a machined aluminum block 51, is spread into a linearly aligned array 52 of individual fibers. The block 51 is attached to a terminating cover assembly 53 and housed within a cylindrical "T" coupler 54. The block 51 is pivotally mounted by a pin 55 at the end of a projection 56 attached to the cover assembly 53. A rod 57 attached to the opposite edge of the block 51 passes through the cover assembly 53 and moved along its axis by a micrometer screw (not shown) which is rotated by knob 58 on the outside face of the cover assembly 53. Thus, by an adjustment of the knob 58, the block 51 is made to pivot about pin 55, providing a degree of vertical alignment of the array 52. The cover assembly 53 is also provided with a flange 61 which mates with a flange 62 of the "T" coupler 54. A seal is provided by a gasket (not shown). The flange 61 is provide with elongated holes 63 through which attaching screws pass. These elongated holes allow the cover assembly 53 to be rotated slightly, thereby allowing a degree of axial alignment of the array 52.

Figure 5:
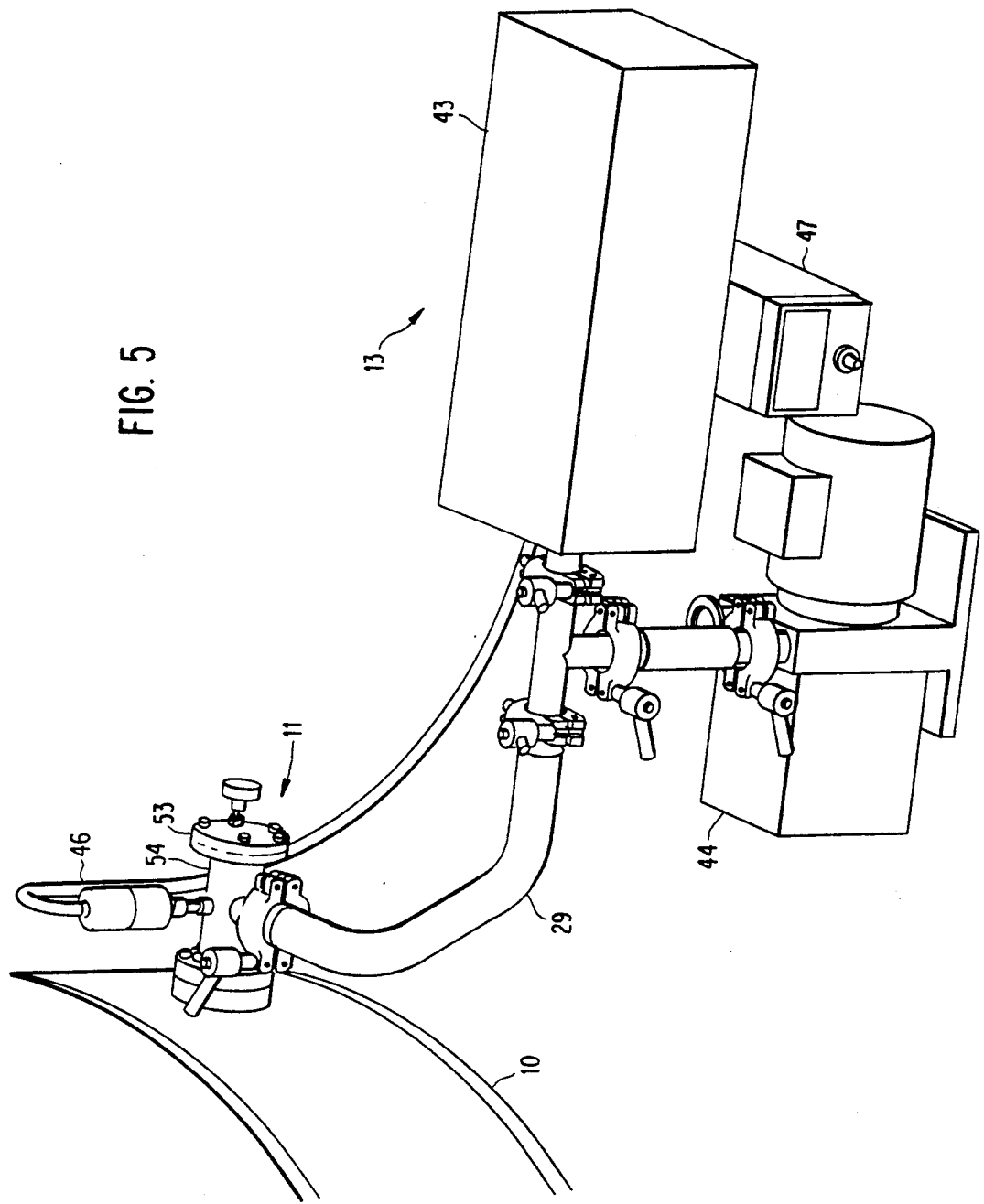
FIG. 5 is an isometric diagram showing the connections of the scanner shown in FIG. 4 to the laser and interconnect system.

As shown in FIG. 5, the line end of the fiber optic cable (within the coupler 54) is located adjacent the entrance window of the plasma tool 10. If necessary, a cylindrical lens may be fitted to the aligned array 52 to control vertical spread of the light. The divergent spread of laser light exiting the fiber cable 50 covers the range of plasma sheath thickness within the reaction chamber of the tool 10 expected during routine processes. The linear array of fibers spreads the light beam power across a line of scan within the reaction chamber electrode without the need for a scanning mirror assembly thereby reducing cost and complexity.

Figure 6:
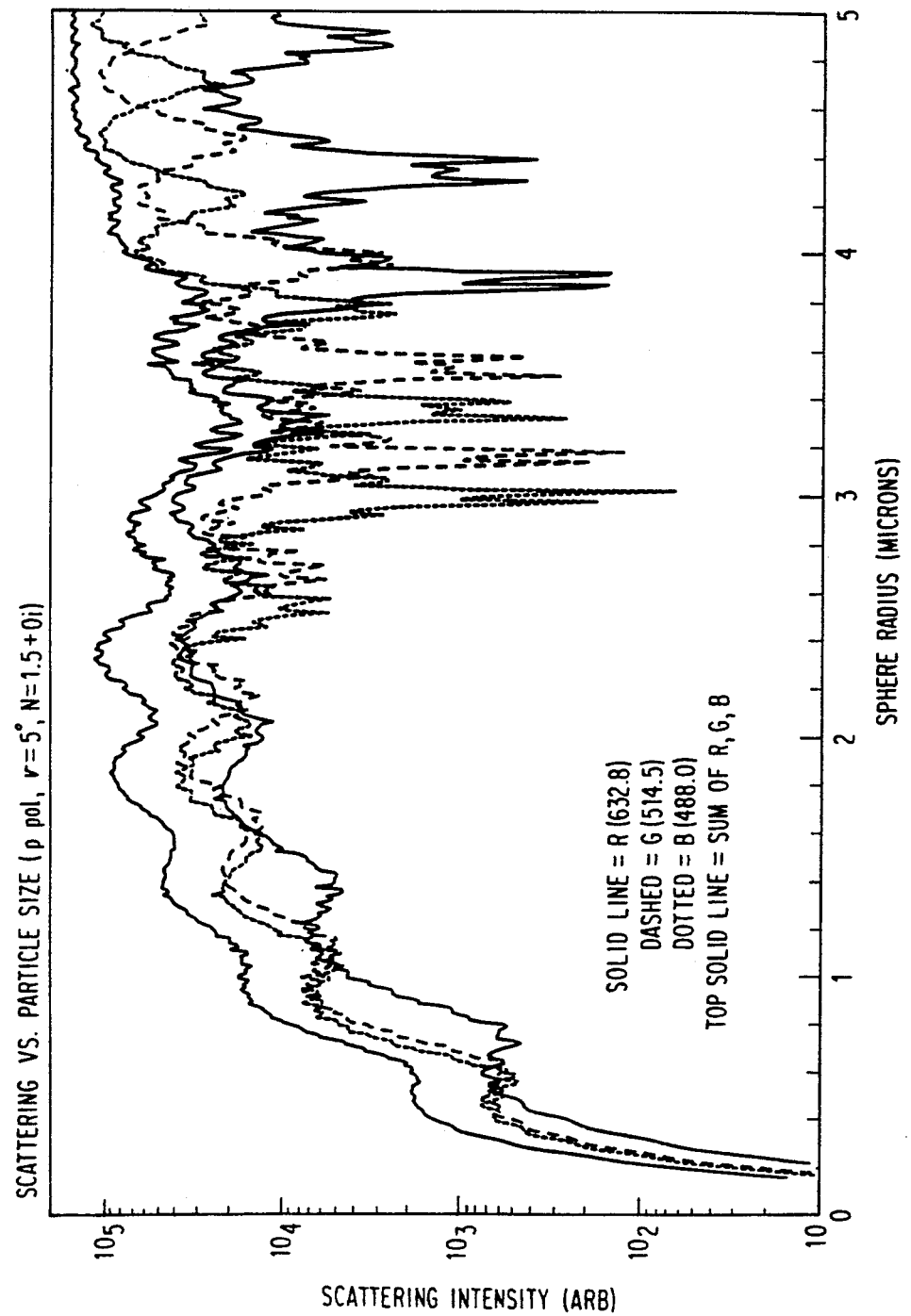
FIG. 6 is a graph showing Mie scattering versus particle size.

The amplitude and angle of light scattering from particles is dependent upon the size and shape relative to the wavelength of incident light. For spherical particles comparable in size to the wavelength of the scanning light, the scattering function is complex and can be numerically solved. FIG. 6 shows a solution of the Mie scattering relation for three wavelengths of light, 488, 514.5 and 632.8 nm, representing the blue, green and red output of Ar and He-Ne lasers. In FIG. 6, the lower solid line represents the 632.8 nm wavelength of red light, the dashed line represents the 514.5 nm wavelength of green light, the dotted line represents the 488 nm wavelength of blue light, and the top solid line represents the sum of the red, green and blue light intensities. It is seen that as the particle size changes, the relative scattering intensity of each of these three wavelengths also changes, with each being dominant for some particle sizes. Thus, the apparent color changes with particle size as the varied combination of red, green and blue light produce discernable colors to the human eye (or the video camera). Accordingly, a growing particle will sequentially change the color of the scattered light when monitored by a red, green and blue mix of incident laser beams. This phenomena has been observed using a combination of lasers to produce the needed overlay of colors. In one embodiment of the invention, the laser is an Ar-Kr continuous-wave laser, sometimes referred to as a "white light" laser, such as the Coherent Model Innova 70 Spectrum Laser. Lasers of this type actually do not produce a continuous light spectra but, rather, a plurality of very narrow spectral light outputs, the combination of which appears to the eye (video camera) to be white light. Use of the Ar-Kr laser greatly simplifies the use of this technique for size information during light scattering. In practice, this technique is used in the manner described for monochromatic laser light scattering in a plasma tool, except that the apparent output color is measured with a color video camera. This information is used to approximate the size of the suspended particles and is useful in determining the source of particles in the plasma process and in evaluating the rate of growth or etching of particles in various plasma processes.

The image provided by the video camera includes the tool interior, wafers on the electrode, and glare from stray laser light reflections and scattering inside the tool. These images often interfere with the light scattered by suspended particles. The suspended particles characteristically move slightly, either in a tight circle or a bobbing up and down motion, due to gas flow, thermal effects and slight variations in the electrostatic trapping fields in the plasma. The background images are, however, stationary and may be subtracted out from the video image. This may be done with hardware or software.

Figure 7:
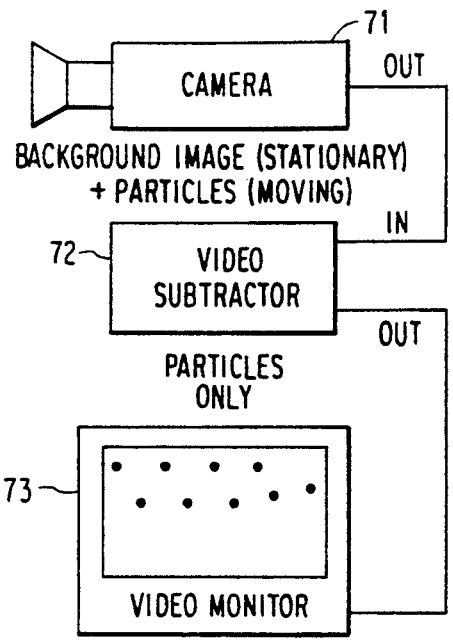
FIG. 7 is a block diagram illustrating the apparatus required for detection of particles with background subtraction.

A hardware implementation for subtracting background images is shown in FIG. 7. The video camera 71 provides an output to a video subtractor 72, such as a Colorado Video Model 492. The difference video image output (i.e., reference image without particles subtracted from real-time image with or without particles) is supplied to a video monitor 73 which shows only the particles present in the plasma. This has the advantage of immediately showing the particles in the plasma without the confusion of the background image and laser glare.

Figure 8:
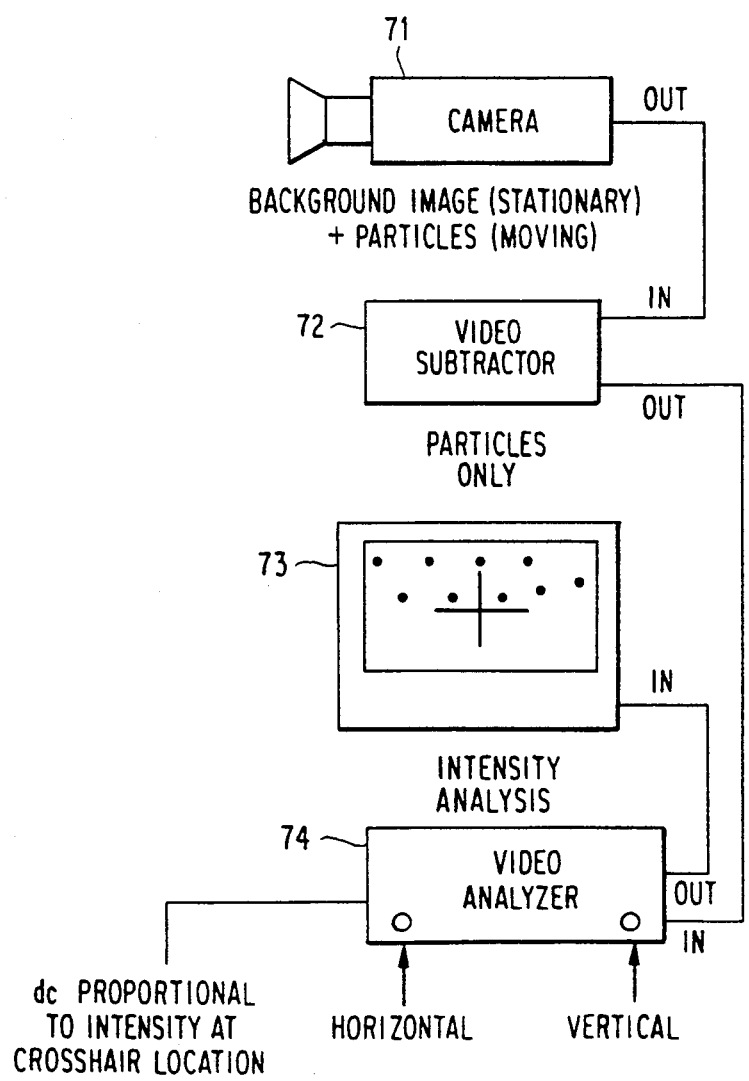
FIG. 8 is a block diagram illustrating the apparatus required for detection of particles with background subtraction and intensity analysis.

The detection of particles with background subtraction in the system shown in FIG. 7 may be further enhanced as shown in FIG. 8 by the use of a video analyzer 74 to quantify the intensity of scattered light at any point in the plasma. A suitable video analyzer is the Colorado Video Model 321. Used typically after video subtraction, the crosshair location is set to a region of light scattering and the analyzer provides a readout of pixel intensity at the cross hair location. With calibration, this provides a quantitative measure of scattering intensity and may be used for particle density estimates. The same arrangement may be done by computer analysis of all or a selected few pixels. This information may then be used to make a go/no-go decision to continue a plasma process or may be used to signal a need for tool cleaning. For example, the intensity at each pixel location may be summed, then if this level is below a predetermined limit, tool use is continued. If above the limit, the tool is taken off-line and is cleaned.

Figure 9:
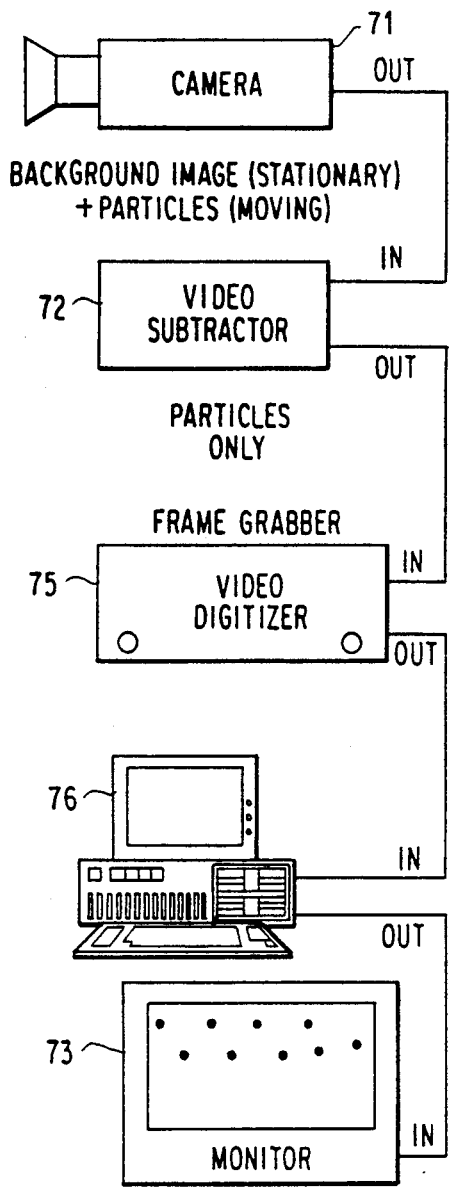
FIG. 9 is a block diagram illustrating the apparatus required for detection of particles with background subtraction and intensity analysis and computer storage.

Another enhancement to the basic system shown in FIG. 7 is shown in FIG. 9. Following video subtraction, the image may then be digitized in real time and stored on a computer. A frame grabber 75, such as the Colorado Video Model 270A, may be used. The digitized output of the frame grabber 75 is supplied to a computer 76, such as an IBM PS/2 personal computer (PC), although in some applications, a mainframe computer may be preferred. The digitized output is stored on the computer's hard disk, or other suitable storage medium, to provide archival storage of contamination measurements. These measurements may be later recalled for product reliability analysis, process optimization, or for developing a preventative maintenance schedule for tool cleaning.

Figure 10:
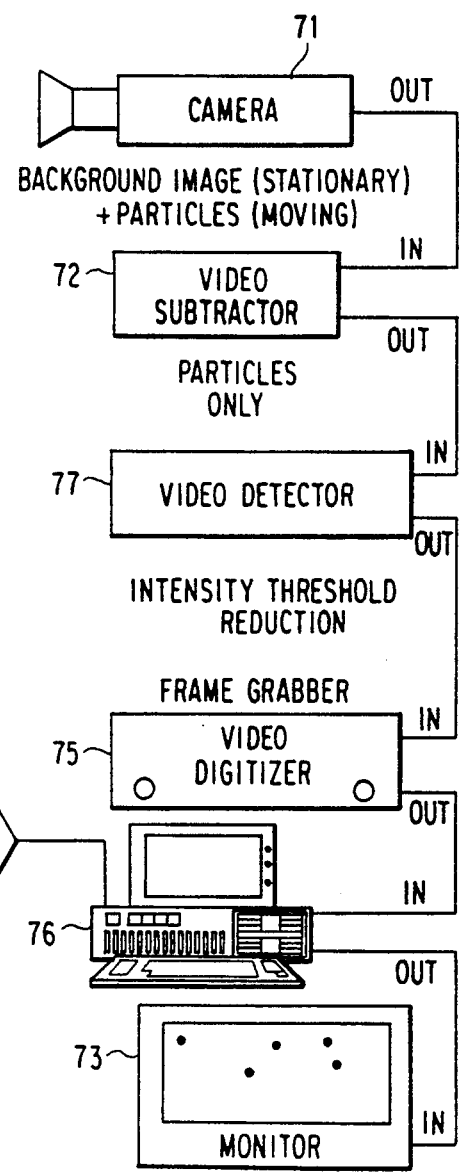
FIG. 10 is a block diagram illustrating the apparatus required for detection of particles with background subtraction, intensity analysis, computer storage and threshold detection.

The light scattering signal for very small particles may be difficult to detect visually, even after video subtraction. This problem is compounded when the tool is operating relatively cleanly and few particles are present. To improve detection efficiency, the system shown in FIG. 9 is modified as shown in FIG. 10 to add a video detector 77, such as the Colorado Video Model 630, used after video subtraction. This unit analyzes the intensity of all pixel locations relative to a predetermined reference level. Pixel intensity less than the reference point are set to zero, while those greater are made maximum intensity. This increases contrast of weak images and is useful only when a meaningful video subtraction is possible. Output of this video contrast enhancer may then be digitized and stored as described above.

As a further refinement, an alarm 78 is controlled by the computer 76 to notify engineers and stop the plasma tool if the density of detected particles exceeds a predetermined threshold. The alarm 78 may be audio, visual or both.

While the invention has been described in terms of several preferred embodiments, those skilled in the art will recognize that the invention can be practiced with modification within the spirit and scope of the appended claims.

Having thus described our invention, what we claim as new and desire to secure by Letters Patent is as follows:

1. A particle detector comprising:
   laser means for generating laser light;
   scanner means for scanning said laser light into a reaction chamber of a plasma processing tool within which particles are to be detected, said scanner means comprising:
   a light tight enclosure;
   coupling means for coupling the laser light into said enclosure;
   moving mirror means aligned with said coupling means for deflecting laser light from said scanning means in a scanning motion; and
   a window in said enclosure adapted to be fitted adjacent a window of said plasma processing tool and through which the laser light is propagated;
   video camera means for generating a video signal of laser light scattered by particles within said plasma processing tool; and
   processing means for processing and displaying an image of said video signal.

2. The particle detector recited in claim 1 further comprising positioning means within said light tight enclosure for moving said moving mirror means in a direction perpendicular to said scanning motion to align scanned laser light with a plasma sheath within said reaction chamber.

3. The particle detector recited in claim 1 further including interlock means for enabling power to said laser means only when said scanner means and said video camera means are attached to said plasma processing tool and said tool is evacuated so as to prevent escape of laser light from said plasma particle detector.

4. The particle detector recited in claim 3 wherein said light tight enclosure comprises part of an evacuated chamber in communication with said laser means, said particle detector further comprising pressure sensor means connected to said evacuated chamber for generating an electrical signal to said interlock means, said interlock means disabling power to said laser means if pressure within said evacuated chamber exceeds a predetermined threshold.

5. A particle detector comprising:
   laser means for generating laser light;
   scanner means for scanning said laser light into a reaction chamber of a plasma processing tool within which particles are to be detected, said scanner means comprising a spot-to-line fiber optic bundle cable having a circular, closely-packed end adjacent said laser means and another end spread into an array of individual fibers, linearly aligned, the linearly aligned array of individual fibers being adjacent a window of said plasma processing tool and serving to disperse light along a scan line;
   video camera means for generating a video signal of laser light scattered by particles within said plasma processing tool; and
   processing means for processing and displaying an image of said video signal.

6. The particle detector recited in claim 5 wherein said light tight enclosure comprises part of an evacuated chamber in communication with said laser means, said particle detector further comprising pressure sensor means connected to said evacuated chamber for generating an electrical signal to said interlock means, said interlock means disabling power to said laser means if pressure within said evacuated chamber exceeds a predetermined threshold.

7. The particle detector recited in claim 6 further comprising positioning means for moving said linearly aligned array in directions perpendicular to said array to align scanned laser light with a plasma sheath within said reaction chamber.

8. A particle detector comprising:
   laser means for generating laser light, wherein said laser means generates a spectrum of laser light including red, green and blue light wavelengths;
   scanner means for scanning said laser light into a volume within which particles are to be detected;
   video camera means for generating a video signal of laser light scattered by particles within said volume; and
   processing means for processing and displaying an image of said video signal, said processing means analyzing said spectrum of laser light to provide an indication of changing particle size during a plasma process.

9. The particle detector recited in claim 8 wherein said laser means comprises a plurality of lasers each generating a respective one of said red, green and blue light wavelengths.

10. The particle detector recited in claim 8 wherein said laser means comprises a single laser capable of sequential and tunable generation of said red, green and blue light wavelengths.

11. The particle detector recited in claim 8 wherein said processing means comprises:
    a video display monitor for displaying an image defined by said video signal; and
    a video cassette recorder for recording said video signal.

12. The particle detector recited in claim 8 wherein said processing means comprises:
    video subtractor means connected to receive said video signal for subtracting from said video signal background images and generating a difference signal; and
    a video display monitor connected to said video subtractor means for displaying an image defined by said difference signal.

13. The particle detector recited in claim 12 wherein said processing means further comprises video analyzer means connected between said camera means and said video display monitor for comparing said video signal with a predetermined threshold to provide a quantitative measure of light scattering intensity.

14. The particle detector recited in claim 12 wherein said processing means further comprises:
    digitizer means connected to said video subtractor means for digitizing frames of said difference signal; and
    storage means connected to receive digitized frames of said difference signal for providing archival storage of said digitized frames.

15. A particle detector comprising:
    laser means for generating laser light;
    scanner means for scanning said laser light into a reaction chamber of a plasma processing tool within which particles are to be detected;
    video camera means for generating a video signal of laser light scattered by particles within said volume;
    processing means for processing and displaying an image of said video signal, wherein said processing means comprises:
       video subtractor means connected to receive said video signal for subtracting from said video signal background images and generating a difference signal;
       a video display monitor connected to said video subtractor means for displaying an image defined by said difference signal;
       digitizer means connected to said video subtractor means for digitizing frames of said difference signal;
       storage means connected to receive digitized frames of said difference signal for providing archival storage of said digitized frames; and
       computer means for accessing frames of said difference signal stored on said storage means and analyzing the accessed frames to provide an indication of performance of said plasma processing tool, said computer means providing an output to said video display monitor.

16. The particle detector recited in claim 15 wherein said processing means further comprises video detector means connected between said video subtractor means and said video digitizer means for increasing contrast of a video image defined by said video signal.

17. The particle detector recited in claim 15 further comprising alarm means connected to said computer means for generating an alarm and stop operation of said plasma tool if the intensity of detected particles exceeds a predetermined threshold.

* * * * *

UNITED STATES PATENT AND TRADEMARK OFFICE
CERTIFICATE OF CORRECTION

PATENT NO. : 5,255,089

DATED : October 19, 1993

INVENTOR(S) : David E. Dybas, Kurt L. Haller, Edward F. Patterson, Gary S. Selwyn It is certified that error appears in the above-identified patent and that said Letters Patent is hereby corrected as shown below:

In column 12, line 4, add:

18. The particle detector recited in claim 1 wherein said processing means comprises:

video subtractor means connected to receive said video signal for subtracting from said video signal background images and generating a difference signal; and a video display monitor connected to said video subtractor means for displaying an image defined by said difference signal.

UNITED STATES PATENT AND TRADEMARK OFFICE
CERTIFICATE OF CORRECTION

PATENT NO. : 5,255,089
DATED : October 19, 1993
INVENTOR(S) : David E. Dybas, et al It is certified that error appears in the above-indentified patent and that said Letters Patent is hereby corrected as shown below:

On the cover page, change "17 Claims, 8 Drawing Sheets" to
--18 Claims, 8 Drawing Sheets--.

Signed and Sealed this

Eighth Day of November, 1994

Attest:

BRUCE LEHMAN

*Attesting Officer*    *Commissioner of Patents and Trademarks*